(12) United States Patent  
Krishnakumar

(10) Patent No.: US 12,117,882 B2
(45) Date of Patent: Oct. 15, 2024

(54) SYSTEM AND METHOD FOR REDUCING POWER CONSUMPTION IN COMPUTING SYSTEMS

(71) Applicant: Hamilton Sundstrand Corporation, Charlotte, NC (US)

(72) Inventor: Balaji Krishnakumar, Bangalore (IN)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 19 days.

(21) Appl. No.: 18/184,164

(22) Filed: Mar. 15, 2023

(65) Prior Publication Data
US 2024/0241563 A1 Jul. 18, 2024

(30) Foreign Application Priority Data

Jan. 16, 2023 (IN) .............. 202311003173

(51) Int. Cl.
G06F 1/3228 (2019.01)
G06F 9/48 (2006.01)

(52) U.S. Cl.
CPC .......... *G06F 1/3228* (2013.01); *G06F 9/4887* (2013.01)

(58) Field of Classification Search
CPC .............................. G06F 1/3228; G06F 9/4887
See application file for complete search history.

(56) References Cited

U.S. PATENT DOCUMENTS

| 5,339,425 A | 8/1994 | Vanderah et al. |
| 5,623,647 A | 4/1997 | Maitra |
| 8,996,331 B2 | 3/2015 | Anderson et al. |
| 9,183,051 B2 | 11/2015 | Inoue |
| 9,459,919 B2 | 10/2016 | Conrad et al. |
| 10,452,437 B2 | 10/2019 | Majumdar et al. |
| 11,399,720 B2 | 8/2022 | Saeidi et al. |
| 2003/0014467 A1* | 1/2003 | Hanzawa .............. G06F 1/3237 718/102 |

(Continued)

FOREIGN PATENT DOCUMENTS

| CN | 111371815 A | 7/2020 |
| ES | 2588027 T3 | 10/2016 |
| JP | 5883967 B2 | 3/2016 |

(Continued)

OTHER PUBLICATIONS

Extended European Search Report issued in European Application No. 23220783.7 dated May 31, 2024.

*Primary Examiner* — Terrell S Johnson
(74) *Attorney, Agent, or Firm* — CANTOR COLBURN LLP

(57) ABSTRACT

A system having: a processor, wherein the processor is configured for executing a process of reducing power consumption that includes executing a first task over a first plurality of timeslots and a second task over a second plurality of timeslots, and wherein the processor is configured to: execute a real-time operating system (RTOS) process; determine that the first task is complete during a first timeslot of the first plurality of timeslots; and enter a low power mode for a reminder of the first timeslot upon determining that there is enough time to enter a low power mode during the first timeslot and a next timeslot is allocated to the first task, otherwise perform a dead-wait for the reminder of the first timeslot.

17 Claims, 4 Drawing Sheets

(56) References Cited

U.S. PATENT DOCUMENTS

2004/0146030 A1* 7/2004 Hsieh ................ H04W 52/0287
370/347
2016/0357248 A1* 12/2016 Lingutla ............... G06F 1/3296

FOREIGN PATENT DOCUMENTS

KR 102161334 B1 9/2020
KR 20220064179 A 5/2022

* cited by examiner

SYSTEM AND METHOD FOR REDUCING POWER CONSUMPTION IN COMPUTING SYSTEMS

CROSS-REFERENCE TO RELATED APPLICATIONS

This application claims the benefit of IN Application No. 202311003173 filed Jan. 16, 2023, the disclosure of which is incorporated herein by reference in its entirety.

BACKGROUND

The embodiments are directed to computing systems and more specifically to a system and method for reducing power consumption in computing systems.

Processors executing software tasks and running at full processing power utilize external cooling mechanisms to prevent generated heat from rising above a maximum processor permissible limit. In a real-time operating system process (or RTOS process), with periodic schedules having a plurality of software tasks, there may be a fixed set of timeslots allocated for each task. However, the software tasks typically do not occupy full set of allocated timeslots. During the unused timeslots, the processor is in a dead-wait, during which the processor runs, though no task is performed. During the dead-wait, the processor may unnecessarily consume power and generate heat, requiring additional load on the external cooling mechanisms. Overutilization of the external cooling mechanisms may reduce their reliability during the execution of critical applications. Reducing the processor speed may require less cooling but may also compromise the overall performance of the processor. In avionics, for example, the failure of an external cooling system or the reduction of a processor speed when the processor is executing task functions may result in undesired safety issues.

BRIEF SUMMARY

Disclosed is a system including: a processor, wherein the processor is configured for executing a process of reducing power consumption that includes executing a first task over a first plurality of timeslots and a second task over a second plurality of timeslots, and wherein the processor is configured to: execute a real-time operating system (RTOS) process; determine that the first task is complete during a first timeslot of the first plurality of timeslots; and enter a low power mode for a reminder of the first timeslot upon determining that there is enough time to enter a low power mode during the first timeslot and a next timeslot is allocated to the first task, otherwise perform a dead-wait for the reminder of the first timeslot.

In addition to one or more aspects of the system, or as an alternate: upon determining the first task is complete during the first timeslot, the processor is further configured to: determine that the next timeslot is allocated to a next task; and perform the dead-wait for the reminder of the first timeslot.

In addition to one or more aspects of the system, or as an alternate: when the first timeslot is an initial timeslot allocated to the first task, the processor is configured to execute context switching while the processor executes the RTOS process.

In addition to one or more aspects of the system, or as an alternate: entering the low power mode includes flushing of instruction cache, flushing translation look-aside buffers and disabling the instruction cache.

In addition to one or more aspects of the system, or as an alternate: upon entering a timeslot that follows the first timeslot, the processor is configured to: determine that the low power mode was entered into during the first timeslot; and enabling the instruction cache.

In addition to one or more aspects of the system, or as an alternate: after enabling the instruction cache, the processor is configured to continue to execute the RTOS process.

In addition to one or more aspects of the system, or as an alternate, the system includes: a cooling mechanism operationally coupled to the processor, wherein the cooling mechanism is deactivated during the remainder of the first timeslot upon entering the low power mode.

In addition to one or more aspects of the system, or as an alternate: the cooling mechanism is a fan.

In addition to one or more aspects of the system, or as an alternate, the system includes: a power unit operationally coupled to the cooling mechanism and the processor.

In addition to one or more aspects of the system, or as an alternate: the power unit is a battery.

Further disclosed is a method of executing a process of reducing power consumption of a processor, including: executing a first task over a first plurality of timeslots and a second task over a second plurality of timeslots, and wherein the method further includes: executing a real-time operating system (RTOS) process; determining that the first task is complete during a first timeslot of the first plurality of timeslots; and entering a low power mode for a reminder of the first timeslot upon determining that there is enough time to enter a low power mode during the first timeslot and a next timeslot is allocated to the first task, otherwise performing a dead-wait for the reminder of the first timeslot.

In addition to one or more aspects of the method, or as an alternate, upon determining the first task is complete during the first timeslot, the method further includes: determining the next timeslot is allocated to a next task; and performing the dead-wait for the reminder of the first timeslot.

In addition to one or more aspects of the method, or as an alternate, when the first timeslot is an initial timeslot allocated to the first task, the method further includes executing context switching while executing the RTOS process.

In addition to one or more aspects of the method, or as an alternate, entering the low power mode includes flushing of instruction cache, flushing translation look-aside buffers and disabling the instruction cache.

In addition to one or more aspects of the method, or as an alternate, upon entering a timeslot that follows the first timeslot, the method includes: determining that the low power mode was entered into during the first timeslot; and enabling the instruction cache.

In addition to one or more aspects of the method, or as an alternate, after enabling the instruction cache, the method further includes continuing to execute the RTOS process.

In addition to one or more aspects of the method, or as an alternate, entering the low power mode further includes depowering a cooling mechanism that cools the processor for the remainder of the first timeslot.

BRIEF DESCRIPTION OF THE DRAWINGS

The present disclosure is illustrated by way of example and not limited in the accompanying figures in which like reference numerals indicate similar elements.

DETAILED DESCRIPTION

The disclosed embodiments provide a process of reducing power consumption for a computing systems such as that used on an aircraft. thermal dissipation associated with the execution of software. As will be appreciated from the disclosure, this process occurs without compromising the processing power of the processor.

Figure 1:
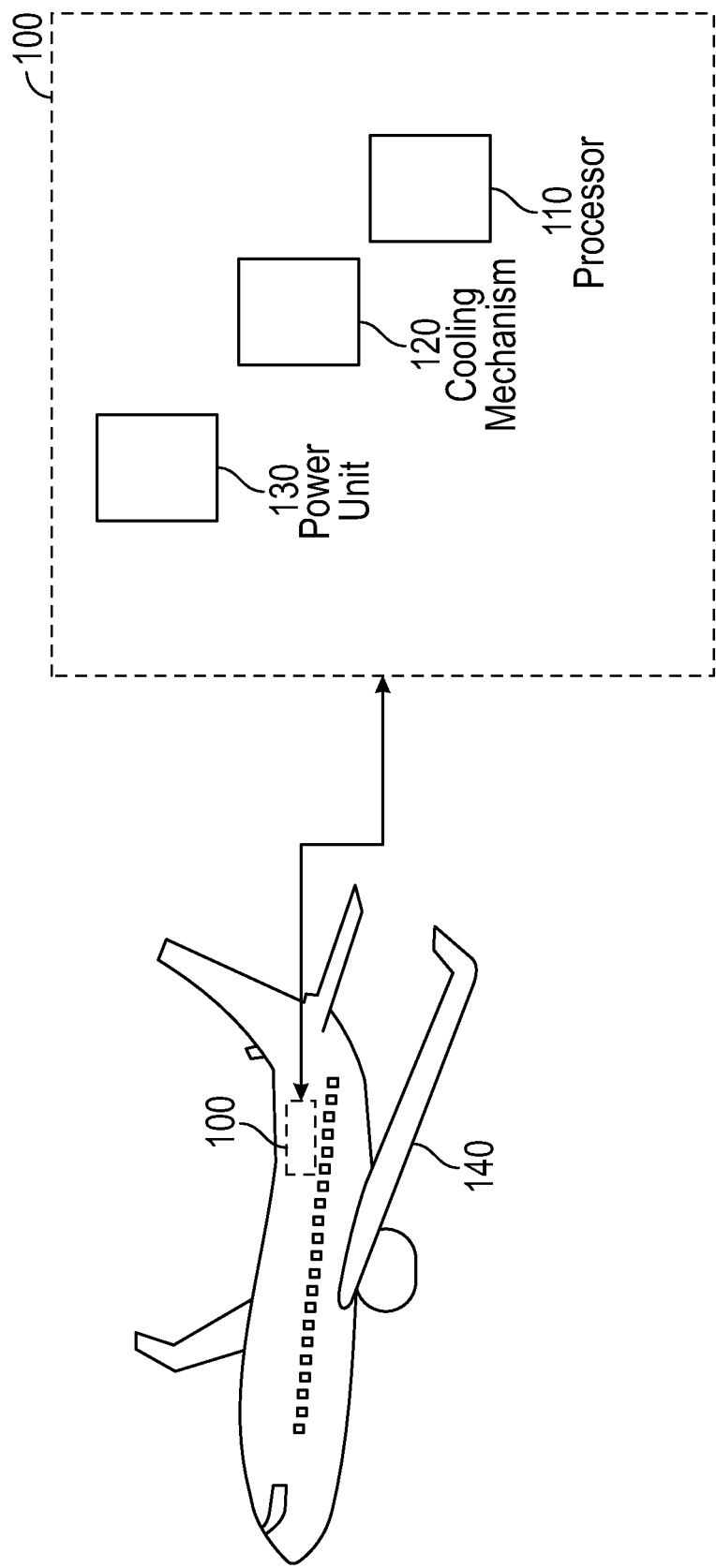
FIG. 1 shows a system configured to reduce power consumption according to an embodiment.

Turning to FIG. 1, a system 100 is shown with a processor 110, a cooling mechanism 120 for the processor 110 and a power unit 130 that powers the cooling mechanism 120 and the processor 110. The cooling mechanism 120 may be a fan and the power unit 130 may be a battery. The system 100 may be an avionics system on an aircraft 140 shown schematically, which may be an enclosed system in which providing cooling to electronics is not a readily available option.

Figure 2:
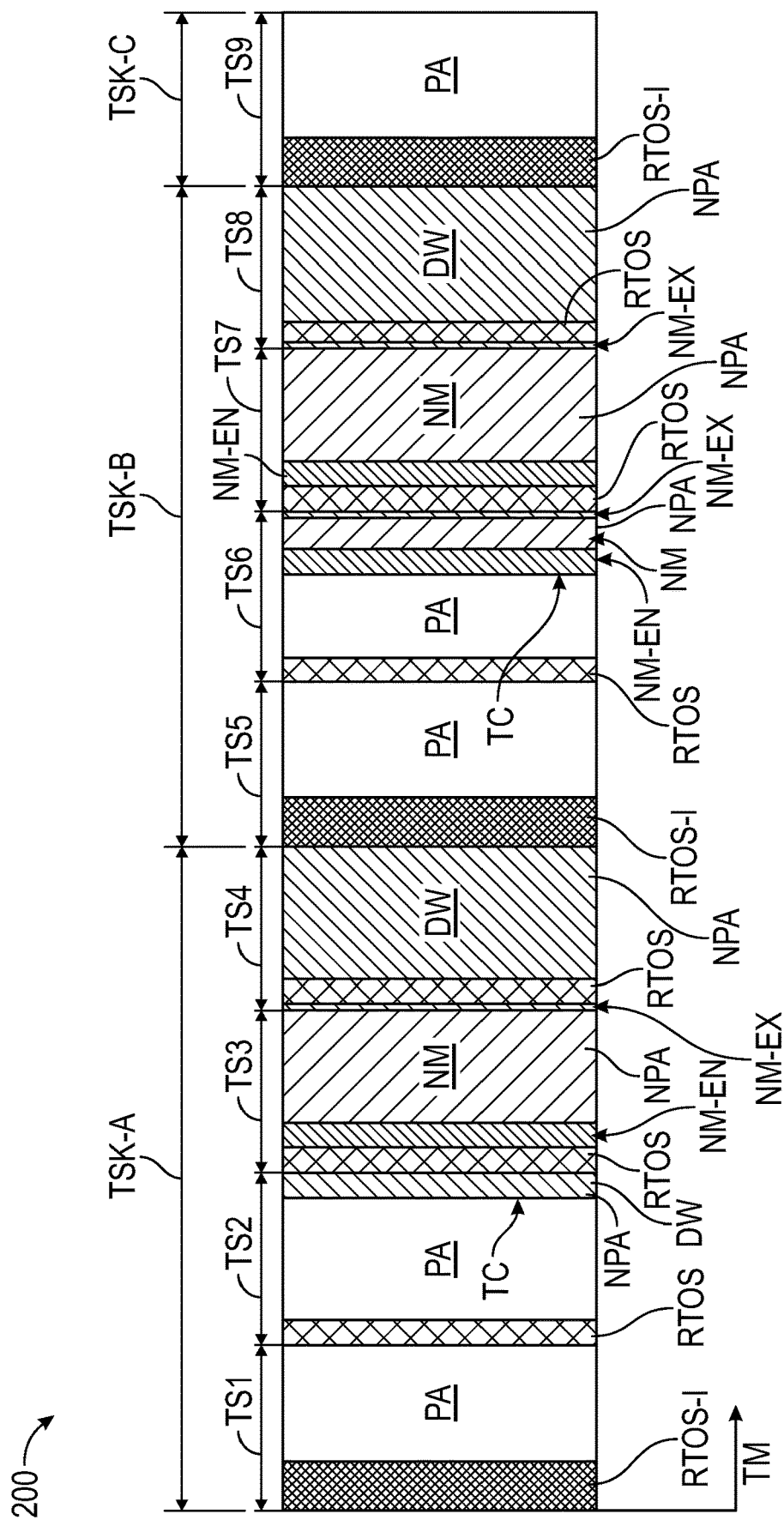
FIG. 2 shows a timing diagram executed by the system according to an embodiment.

As shown in FIG. 2, the system 100 provides an operational schedule or protocol 200 for the processor 110 that divides the processing time of the processor 110 for different tasks (or TSK) into plural time-sequential timeslots (or TS). In the illustrated example, there are three TSKs including a first task (TSK-A), a second task (TSK-B), and a third task (TSK-C). The processor 110 allocates nine TSs, e.g., first through ninth timeslots (TS1-TS9) to complete these TSKs. Four of the TSs, i.e., TS1-TS4, which are a first plurality of TS, are allocated for the first TSK-A and four other TSs, i.e., TS5-TS8, which are a second plurality of TSs, are allocated for the TSK-B. One TS9 is allocated for the third TSK-C. The allocation of TSs to the differing TSKs is predetermined, for example, based on an expected time to perform a TSK. In operation, the processor 110 may process the TSK in fewer than the allocated number of TSs. That is, each TSK represents a processing function that requires a finite execution time (illustrated in FIG. 2 as TM), and such execution may span across fewer TSs than originally allocated.

At the onset of each TS, a certain amount of time in each TS is unavailable for task processing because it is occupied by the RTOS process. The RTOS process at the start of a new TSK, which is a RTOS-i (initial) process, is longer than the RTOS process in TSs of a same TSK. This is because the RTOS-i process includes the additional requirement of context switching. Context switching is the saving the context of a previous TSK and generating or restoring a context for the new TSK. For simplicity, the RTOS process and RTOS-i process may both be referred to as an RTOS process.

For each of the TSs in a TSK, the processor 110 may perform processing activity (or PA) throughout an entire available TSK processing time in a TS or part of the TS. The available TSK processing time is time not otherwise accounted for to perform the RTOS process. For example, as illustrated and not by way of limitations, with respect to TSK-A, the available TSK processing time in TS1 is completely occupied with PA and TS2 is partially occupied with PA. With respect to TSK-B, the available TSK processing time in TS5 is completely occupied with PA while TS6 is partially occupied with PA. For TSK-C, the available TSK processing time in TS9 is completely occupied with PA.

On the other hand, certain TSs may be entirely or partially unoccupied with a PA in the available TSK processing time. That is, the TS may have negligible processing activity (or NPA) in the available TSK processing time, because processing required for the TSK is complete, that is, a TSK complete (or TC) state is reached. For TSK-A, the TC state is reached during TS2. Thus a portion of the available TSK processing time in TS2 has NPA. For the same reason, available TSK processing time in TS3 and TS4 have only NPA. For TSK-B, the TC state is reached during TS6. Thus the available TSK processing time for a portion of TS6 has NPA. The available TSK processing time for TS7 and TS8 have NPA.

According to the protocol 200, the processor 110 may operate in a low power mode, otherwise referred to as a nap mode (NM), for the duration of time in a TS that is available for TSK processing and NPA is required. As discussed in greater detail below, the processor 110 executes a process for entering NM, identified as NM-EN and another process for exiting NM, identified as NM-EX. During an NM, the cooling mechanism 120 may be deactivated.

The process of NM-EN may be executed within a TS after the RTOS process has completed and TSK processing has also completed. Executing NM-EN involves performing sequence of steps including flushing instruction cache, flushing translation look-aside buffers (TLBs), disabling the instruction cache and then entering the low power mode, collectively referred to as the nap-entering sequence. If the nap-entering sequence is interrupted, the processor 110 might undesirably enter an undefined state. Thus, under the protocol 200, NM may be entered in a TS provided that there is enough time to completely execute the nap-entering sequence.

Executing NM-EX involves re-enabling the instruction cache which was disabled while executing NM-EN. In each instance where the processor 110 enters NM, the processor 110 executes NM-EX at the start of the next TS and revaluates whether to enter NM, as it does for each TS. Exiting NM is time consuming. To avoid impacting the ability of a processor 110 to perform a next TSK, the processor 110 does not enter NM during a last TS of a TSK. That is, under the protocol 200, to enter NM in a TS, a next TS should be within the same TSK.

Under the protocol 200, the processor 110 performs a dead-wait (or DW) (otherwise referred to as entering a dead-wait state) during the time (TM) in a TS where there is NPA and the processor 110 cannot enter NM for reasons identified above. DW does not reduce the processing load of the processor 110 to the extent of NM. AS a result external cooling of the processor 110 is required during DW, placing the additional workload strain on the cooling mechanism 120.

Applying the above protocol 200 to the TSKs in FIG. 2, during TSK-A, the processor 110 enters NM during TS3. During TSK-B, the processor 110 enters NM during part of TS6 and all of TS7. For each of these TSs, there was NPA for at least a portion of the available TS processing time because the TC state was reached, there was enough time to execute NM-EN, and the following TS was within the same TSK.

For the first TSK-A, the second TS2 has NPA but NM cannot be entered for that TS because there was insufficient time to execute NM-EN after the TC state was reached. In addition, the fourth TS4 has NPA but a NM cannot be entered for that TS, even though the TC state has been reached, because the next TS is allocated to TSK-B. The same condition applies to TS8. That is, there is NPA but NM cannot be entered for that TS, even though the TC state has been reached, because the next TS is allocated to TSK-C.

Figure 3:
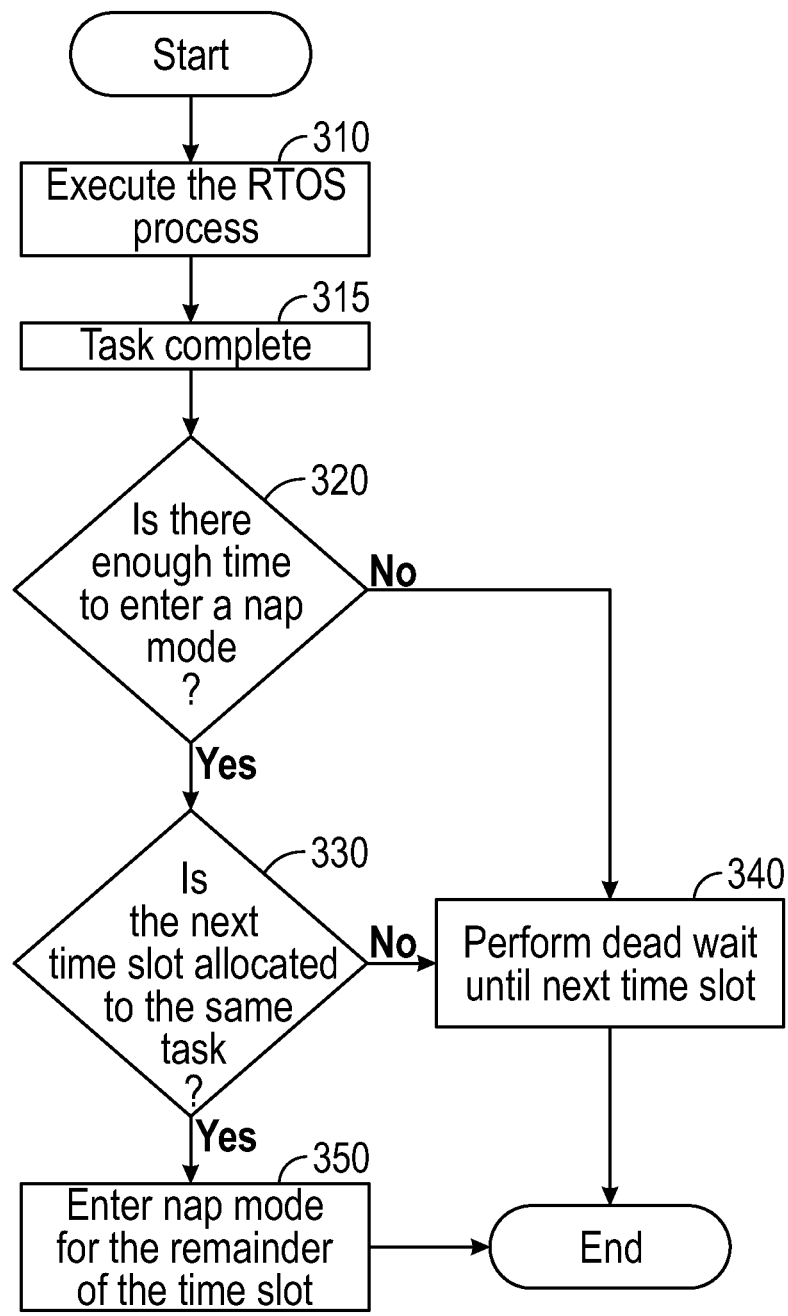
FIG. 3 is a flowchart showing a process of the system entering a low power (nap) mode.

Turning to FIG. 3, the flowchart shows the process of entering the NM during a TS of a TSK in which the TC state is reached. During the TS, the RTOS process is executed at block 310. Then a determination is made at block 315 during the TS that the TC stated is reached, i.e., the TSK is complete and there will be NPA for the remainder of the TS. At block 320 the processor 110 makes a determination as to whether there is enough time remaining in the TS to safely execute NM-EN, e.g., whether there is enough time to execute the nap-entering sequence.

If enough time is available for the processor 110 to enter NM (YES at 320) in a TS, a determination is made at block 330 as to whether the next TS is allocated to same TSK, e.g., or is allocated to a next TSK. If the next TS is within the same TSK (YES at 330), then the processor 110 executes NM-EN by executing the nap-entering sequence at block 350. The processor 110 will remain in NM for the reminder of the TS. If there is not enough time for the processor 110 to execute NM-EN (NO at 320) or if the next TS is not within the same TSK (NO at 330), then the processor 110 performs a DW until the next TS at block 340.

Figure 4:
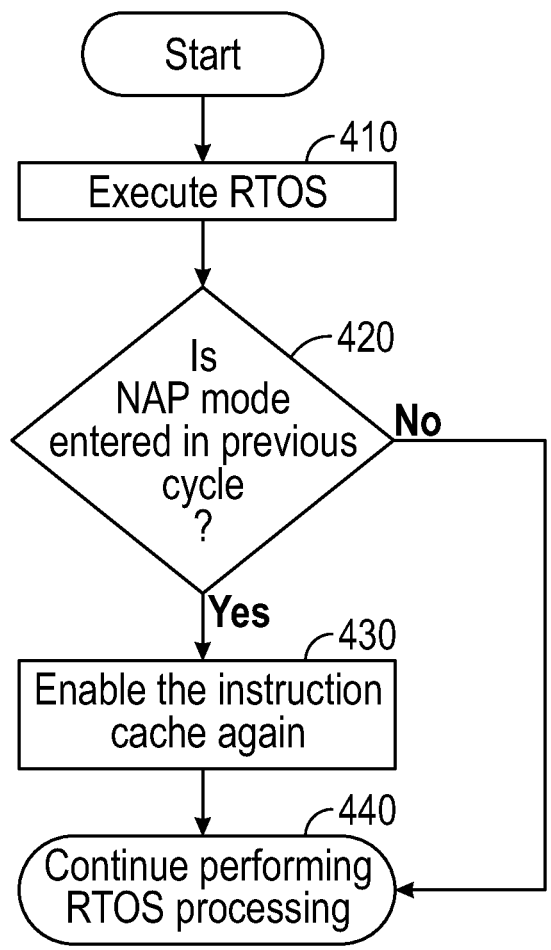
FIG. 4 is a flowchart showing a process of the system exiting the low power mode.

Turning to FIG. 4, the flowchart shows the process of exiting the NM. At the beginning of a TS following an NM, which would be in the same TSK as the prior TS, the processor 110 executes the RTOS process at block 410. During this time, the processor 110 checks at block 420 to see whether NM was entered in the previous TS, as it does for each TS. If in the previous TS, the processor 110 entered NM (YES at 420), then the processor 110 executes NM-EX of enabling the instruction cache at block 430 and the processor 110 continues with the RTOS process at block 440. Otherwise, if the processor 110 had not entered NM (NO at 420) then the processor 110 continues with the RTOS process at block 440.

It can be appreciated that the processor 110 may enter NM for many TSs. During the NM, the generation of heat by the processor 110 is substantially diminished compared with, for example, a DW. Thus, the utilization of the cooling mechanism 120 is reduced. The embodiments therefore increase the useful life and reliability of the cooling mechanism 120. In avionics, for example, this reduces a safety issue related to the processor 110 without having to reduce a processing power of the processor 110 while executing critical task functions.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A system comprising:
a processor,
wherein the processor is configured for executing a process of reducing power consumption that includes executing a first task over a first plurality of timeslots and a second task over a second plurality of timeslots, and wherein the processor is configured to:
execute a real-time operating system (RTOS) process;
determine that the first task is complete during a first timeslot of the first plurality of timeslots; and
enter a low power mode for a remainder of the first timeslot upon determining that there is enough time to enter a low power mode during the first timeslot and a next timeslot is allocated to the first task, otherwise perform a dead-wait for the remainder of the first timeslot.

2. The system of claim 1, wherein:
upon determining the first task is complete during the first timeslot, the processor is further configured to:
determine that the next timeslot is allocated to a next task; and
perform the dead-wait for the remainder of the first timeslot.

3. The system of claim 1, wherein:
when the first timeslot is an initial timeslot allocated to the first task, the processor is configured to execute context switching while the processor executes the RTOS process.

4. The system of claim 1, wherein:
entering the low power mode includes flushing of instruction cache, flushing translation look-aside buffers and disabling the instruction cache.

5. The system of claim 4, wherein:
upon entering a timeslot that follows the first timeslot, the processor is configured to:
determine that the low power mode was entered into during the first timeslot; and
enabling the instruction cache.

6. The system of claim 5, wherein:
after enabling the instruction cache, the processor is configured to continue to execute the RTOS process.

7. The system of claim 1, further comprising:
a cooling mechanism operationally coupled to the processor, wherein the cooling mechanism is deactivated during the remainder of the first timeslot upon entering the low power mode.

8. The system of claim 7, wherein:
the cooling mechanism is a fan.

9. The system of claim 7, further comprising:
a power unit operationally coupled to the cooling mechanism and the processor.

10. The system of claim 9, wherein:
the power unit is a battery.

11. A method of executing a process of reducing power consumption of a processor, comprising:
executing a first task over a first plurality of timeslots and a second task over a second plurality of timeslots, and wherein the method further comprises:
executing a real-time operating system (RTOS) process;
determining that the first task is complete during a first timeslot of the first plurality of timeslots; and
entering a low power mode for a remainder of the first timeslot upon determining that there is enough time to enter a low power mode during the first timeslot and a next timeslot is allocated to the first task, otherwise performing a dead-wait for the remainder of the first timeslot.

12. The method of claim 11, wherein:
upon determining the first task is complete during the first timeslot, the method further comprises:
determining the next timeslot is allocated to a next task; and
performing the dead-wait for the remainder of the first timeslot.

13. The method of claim 11, wherein:
when the first timeslot is an initial timeslot allocated to the first task, the method further comprises executing context switching while executing the RTOS process.

14. The method of claim 11, wherein:
entering the low power mode includes flushing of instruction cache, flushing translation look-aside buffers and disabling the instruction cache.

15. The method of claim 14, wherein:
upon entering a timeslot that follows the first timeslot, the method includes:
determining that the low power mode was entered into during the first timeslot; and
enabling the instruction cache.

16. The method of claim 15, wherein:
after enabling the instruction cache, the method further comprises continuing to execute the RTOS process.

17. The method of claim 16, wherein entering the low power mode further comprises depowering a cooling mechanism that cools the processor for the remainder of the first timeslot.

* * * * *